United States Patent [19]

Walch et al.

[11] 4,354,938

[45] Oct. 19, 1982

[54] HEMODIALYSIS MEMBRANE AND PROCESS AND APPARATUS FOR USING SAME IN HEMODIALYSIS

[75] Inventors: Axel Walch, Frankfurt; Max Bytzek, Wiesbaden; Jürgen Wildhardt, Wallrabenstein; Klaus-Dieter Hammer, Mainz, all of Fed. Rep. of Germany

[73] Assignee: Hoechst Aktiengesellschaft, Frankfurt am Main, Fed. Rep. of Germany

[21] Appl. No.: 932,550

[22] Filed: Aug. 10, 1978

[30] Foreign Application Priority Data

Aug. 13, 1977 [DE] Fed. Rep. of Germany ....... 2736569

[51] Int. Cl.³ .................... B01D 13/00; B01D 31/00
[52] U.S. Cl. .................................. 210/637; 210/646; 210/321.3
[58] Field of Search ................. 210/500 M, 321 F, 23, 210/22, 645, 646, 647, 650, 651, 321.3, 321.4, 433.2, 500.2, 637; 264/41; 536/60, 61; 428/393, 398

[56] References Cited

U.S. PATENT DOCUMENTS

| 2,467,436 | 4/1949 | Lanning | 117/145 |
|---|---|---|---|
| 2,698,967 | 1/1955 | Reichel et al. | 264/197 |
| 2,744,292 | 5/1956 | Schlosser et al. | 536/60 X |
| 2,757,495 | 8/1956 | Reichel | 156/203 |
| 2,904,841 | 9/1959 | Haugh | 264/40.2 |
| 2,999,756 | 9/1961 | Shiner et al. | 99/176 |
| 3,051,316 | 8/1962 | MacNeill | 210/321.3 |
| 3,121,761 | 2/1964 | Osborn | 210/500 M |
| 3,280,234 | 10/1966 | Osborn | 210/500 M |
| 3,546,209 | 12/1970 | Lipps | 210/500 M |
| 3,567,809 | 3/1971 | Ueno et al. | 210/500 M |

FOREIGN PATENT DOCUMENTS

| 378342 | 8/1932 | United Kingdom | 210/500 M |
|---|---|---|---|
| 1276152 | 6/1972 | United Kingdom | 210/500 M |

OTHER PUBLICATIONS

*J. Phys. Chem.* 1961, pp. 166 to 172, "Modif of Pane Size and Shape in Cellophane Membranes".
Method of Biochemical Analysis, vol. 10, 1962 Interscience Publ. N.Y., London, Crairg, King "Dialysis", Seiter, 183-185.

*Primary Examiner*—David R. Sadowski
*Attorney, Agent, or Firm*—Schwartz, Jeffery, Schwaab, Mack, Blumenthal & Koch

[57] ABSTRACT

Disclosed is a viscose membrane suitable for hemodialysis, comprising a viscose membrane substantially equally oriented in the longitudinal and in the transverse directions, having in the dry state a birefringence in each direction of not more than about $6 \times 10^{-3}$ and a phase difference of not more than about 150 nm, and wherein during transition from a dry into a wet state, the membrane undergoes a shrinkage of between about 0.5 and 10 percent both in the longitudinal and in the transverse directions. The membrane is produced by a process which is characterized in that the membrane is transversely stretched by 40 to 120% prior to drying.

12 Claims, 2 Drawing Figures

HEMODIALYSIS MEMBRANE AND PROCESS AND APPARATUS FOR USING SAME IN HEMODIALYSIS

BACKGROUND OF THE INVENTION

The present invention relates to a viscose membrane, in particular to a membrane used for hemodialysis, to a process for the manufacture of the membrane, and to its use. A "viscose membrane" is a membrane comprised of regenerated cellulose and prepared from viscose.

The dialytic process and the apparatuses known as "artificial kidneys" are mainly used for the treatment of chronic kidney diseases, wherein toxic metabolites and metabolites normally contained in urine are removed from the patient's blood by means of, preferably permselective, i.e., selectively permeable, membranes. Metabolites are those compounds of the living cells which control the normal course of metabolic reactions, as well as products of metabolism formed or catabolized in human or animal organisms. Metabolites normally contained in urine are low molecular weight compounds, such as urea, creatinine, or water, and higher molecular weight compounds, such as carbohydrates and peptides, which are removed from the blood and leave the body with the urine if the kidneys are properly working.

The purpose of hemodialytic process is to transfer the toxic metabolites and the metabolites normally contained in urine, as far as possible quantitatively, out of the blood and into a rinsing fluid, especially with the aid of dissolution/diffusion processes, through the gel-like pores of a permselective membrane. The driving force for the diffusion of any diffusible substance through the membrane is the difference in concentration on each side of the membrane (diffusive permeability).

A low pressure gradient is sufficient for the permeation of water (ultrafiltration), produced by means of a higher hydrostatic pressure prevailing on the blood side of the dialyzer or a reduced pressure being applied to the dialysis side.

Besides good compatibility with blood and good wet strength, a good dialyzing capacity, i.e., permeability, is expected from a suitable dialysis membrane. For practical purposes, membranes of regenerated cellulose are preferred, while membranes of fully synthetic polymers, for example, these based on polyacrylonitrile, cellulose acetate, or polycarbonate, can be less economically manufactured on a commercial scale, and their use in the construction of dialyzers and their dialyzing capacity or wet strength in dialyzers are not satisfactory by present standards of the art.

Commercially available dialysis membranes consisting of regenerated cellulose are preferably manufactured by two fundamentally different processes, viz. either by the viscose process or by the cuprammonium process. According to the first process, a viscose solution prepared by xanthogenation is "spun", i.e., coagulated, to form sheet-like bodies of viscose gel, which are then regenerated in an acid medium to form cellulose hydrate gel, washed, desulfurized, treated with plasticizers, and dried. According to the second process, cellulose is converted by means of an aqueous ammoniacal solution ("Schweizer's Reagent") into a clear solution of a complex compound which is then coagulated to form sheet-like bodies. The cellulose is then regenerated in a suitable medium.

Due to their completely different methods of manufacture, the membranes produced by these processes differ very much in their structure, and, consequently show substantial differences in their dialytic properties.

Thus, the membranes manufactured by the cuprammonium process have the disadvantage that their molecular weight exclusion limit is restricted to about 5,000 to 10,000 Dalton, so that metabolites of medium and high molecular weight collect in the blood of the patient during dialysis. Furthermore, this process requires relatively expensive measures for recovery of the copper salts used and for purification of the membrane from copper traces. Although the known viscose membranes do not have these drawbacks, their dialyzing capacity has thus far not been satisfactory or they have only poor wet strength. Therefore, they are scarcely suitable for the purpose of hemodialysis, particularly since ultrafiltration and diffusive permeability of known dialyzing tubes made of cellulose hydrate manufactured by the viscose process are normally insufficient. By extruding very thin membranes, higher values may be obtained for the diffusive permeability, but only at the expense of wet strength—frequently also referred to as the bursting pressure—accompanied by a disproportionate increase in ultrafiltration, which is not desirable in all cases, and, above all, accompanied by serious problems of extrusion technique. Up until now, it has been impossible to achieve a suitable relation between ultrafiltration and diffusive permeability. Most of all, however, the known dialysis membranes of regenerated cellulose, i.e., both those manufactured by the viscose process as also those manufactured by the cuoxame process, sometimes display a swelling or increased area extending transversely or longitudinally to their direction of extrusion. Owing to this swelling, conventional dialyzer constructions must be provided with very expensive profiles to support the membranes, in order to keep the blood-filling volume of the apparatus as small as possible, or constant, when a transmembrane pressure is applied.

According to an article in *J. Phys. Chem.*, 1961, 65, pages 166 to 172, commercially available dialysis membranes of regenerated cellulose are to be stretched as uniformly as possible, by hydraulic pressure, in the longitudinal and transverse directions in order to improve their dialytic properties. This means that completely finished membranes, i.e., dried membranes, are subjected to the stretching process. The permeability of these membranes, which are re-dampened and then stretched, is, however, not satisfactory. Furthermore, since the commercially available viscose membranes have different strength values in the longitudinal direction and the transverse direction, different strength values are also retained after treatment in accordance with this publication. Moreover, it is expressly stated that only limited stretching is possible.

U.S. Pat. Nos. 3,121,761 and 3,280,234 disclose flat regenerated cellulose sheets for packaging processes, to which a high strength in the longitudinal and in the transverse direction and good dimensional stability are imparted by biaxially stretching a tube of coagulated, but not yet regenerated viscose film. For this purpose, an extruded tube of viscose gel is stretched, prior to regeneration, by one and a half (1½) to four and a half (4½) times its original length and circumference, the strength required for a packaging film and the desired low permeability being produced by a uniform stretching of the tube in the longitudinal and in the transverse direction prior to the regeneration of the cellulose.

These patents do not contain the teaching of using these packaging films as improved hemodialysis membranes, or of causing substantial improvement of their permeation properties by applying defined stretching conditions to the films after regeneration of the cellulose. Moreover, it would be highly difficult technically to pass large-sized tubes of viscose gel, i.e., having a diameter of more than about 30 to 40 mm, through regenerating and washing baths if their thickness is less than 50 microns in the wet state.

SUMMARY OF THE INVENTION

Thus, it is an object of the present invention to improve the diffusive permeability, ultrafiltration, and, at the same time, the wet strength of known membranes and to reduce their tendency to area swelling.

Another object of the present invention is to provide a viscose membrane which is especially suited for hemodialysis and which is characterized in that it is substantially equally oriented in the longitudinal and in the transverse direction and that, in the dry state, it has birefringence in each direction of not more than $6 \times 10^{-3}$ and a phase difference of not more than 150 nm.

A further object of the present invention resides in providing a process for the manufacture of a viscose membrane which is especially suited for hemodialysis.

In accomplishing the foregoing objects, there has been provided in accordance with the present invention a viscose membrane suitable for hemodialysis, comprising a viscose membrane substantially equally oriented in the longitudinal and in the transverse directions and having in the dry state a birefringence in each direction of not more than about $6 \times 10^{-3}$ and a phase difference of not more than about 150 nm. Preferably, during transition from a dry into a wet state, the membrane undergoes a shrinkage of between about 0.5 and 10 percent both in the longitudinal and in the transverse directions.

In accordance with another aspect of the invention, there has been provided a process for manufacturing the viscose membrane set forth above, comprising the steps of producing a sheet of cellulose hydrate gel, preferably in tube form, from viscose, freeing said cellulose hydrate gel from acids, salts and sulfur-containing products; treating the cellulose hydrate gel sheet with a plasticizer solution; transversely stretching the cellulose hydrate gel sheet by an amount of from about 40 to 120 percent and thereafter drying the sheet.

In accordance with yet another aspect of the present invention, there has been provided an improvement in a hemodialysis process and an apparatus for performing hemodialysis, including a hemodialysis membrane, means for transporting blood into contact with a first side of the membrane and means for withdrawing metabolites from a second side of the membrane. The improvement comprises using for the dialysis membrane the viscose membrane as defined above.

Other objects, features and advantages of the present invention will become apparent from the detailed description of preferred embodiments which follows, when considered in light of the attached figures of drawings.

DETAILED DESCRIPTION OF PREFERRED EMBODIMENTS

Figure 1:
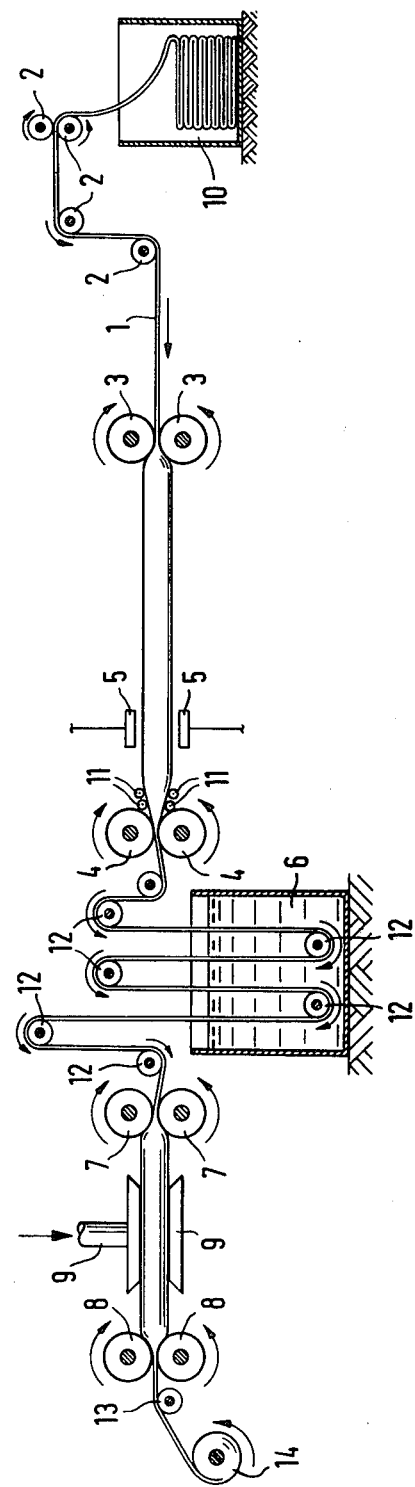
FIG. 1 illustrates schematically the apparatus for carrying out the method according to the invention.

As is known, the birefringence of a membrane is the difference between the refractive indices in the longitudinal and in the transverse directions ($n_2-n_1$), and the phase difference is defined as $(n_2-n_1)d$, wherein d is the thickness of the membrane.

In the case of the smallest difference, the values of the birefringence approach zero.

The refractive indices of the dry membrane are determined, for example, with the aid of a "Leitz" polarization microscope with a "Berek" compensator, measurements being taken both in the direction of spinning and transversely to it.

Surprisingly, it was found that the above defined objects are achieved by stretching the cellulose hydrate gel formed during the manufacture of the viscose membrane in the transverse direction after its regeneration from viscose gel, but before it is dried, so that the resulting membrane is about equally oriented in the longitudinal and in the transverse directions.

During its transition from the dry into the wet state, i.e., for example, when it is put into operation, the membrane advantageously undergoes a shrinkage of between 0.5 and 10 percent, both in the longitudinal and in the transverse direction.

In the process according to the invention for producing the viscose membranes suitable for dialysis, a sheet-like or tubular body of cellulose hydrate gel is prepared from viscose, freed from acids, salts and sulfurous products, treated with a plasticizer solution, and finally dried. The process is characterized in that, before drying, the cellulose hydrate gel body is stretched in the transverse direction by 40 to 120 percent.

The production of cellulose hydrate gel from viscose is known and may be performed by the following method, for example:

First, a viscose solution is produced by xanthogenation. For this purpose, cellulose is treated with sodium hydroxide solution to form alkali cellulose which, as the next step, is transformed into cellulose xanthogenate by treatment with carbon bisulfide in an alkaline medium, and the resulting cellulose xanthogenate is then transformed into viscose in an aqueous sodium hydroxide solution. In most cases, the viscose solution still contains between 4 and 15 percent by weight of cellulose. After ripening, the viscose is spun, i.e., coagulated, for example, by extrusion from an annular slot die with a 200 to 700 micron wide orifice to yield a tube. The spinning bath may contain, for example, a total of 20 to 50 percent by weight of sulfuric acid, sodium sulfate, and/or ammonium sulfate. This process is described in more detail in British Patent No. 1,240,560, the disclosure of which is hereby incorporated by reference.

In further process steps, the sheet-like or tubular product of viscose gel is regenerated in an acid medium, for example in dilute (less than 5 percent) by weight) sulfuric acid to form cellulose hydrate gel, washed with water to remove acids and salts, desulfurized, for example, with a sodium sulfate solution, passed through a bleaching bath if desired, and finally passed through a dilute plasticizer bath containing, for example, a 10 to 15 percent aqueous solution of glycerol, sorbitol, or glucose. See, e.g., French Pat. No. 1,385,394, the disclosure of which is also incorporated by reference.

According to the prior art, the cellulose hydrate gel is then converted, by thorough drying at 100° to 140° C., from the open-pore gel state into a dehydrated and thus more compact membrane of regenerated cellulose. If flat membranes are to be produced, the tube may be slit open.

The inventive properties are imparted to the membrane by stretching the tube of regenerated cellulose hydrate gel before drying it, the tube being stretched, by inflation, by about 40 to 120 percent, preferably by about 60 to 100 percent for tubes of conventional sizes, in the transverse direction. Longitudinal stretching is performed, in accordance with the present state of the art, during the spinning process and depends, as is known, on the viscose, on the quantity of viscose supplied to the annular slot per unit of time, on the width of the annular slot, and on the draw-off speed of the coagulating viscose. A further stretching during the following process steps should be avoided as far as possible. Thus, with the longitudinal stretching being given, the degree of transverse stretching is selected so that the membrane according to the invention is substantially equally oriented in the longitudinal and in the transverse directions. Thus, for the tubes of each size, an optimum degree of transverse stretching exists by which a defined relation between ultrafiltration and diffusive permeability may be adjusted. Furthermore, contrary to prior art membranes, a shrinkage between about 0.5 and 10 percent both in the longitudinal and in the transverse direction is thus achieved during transition to the membrane from the dry state to the wet state. The resulting area shrinkage enables a very small blood filling volume in dialyzer constructions having a fixed membrane.

Membranes with a surprisingly high diffusive permeability and ultrafiltration during hemodialysis are obtained if the tube is treated with an additional plasticizer solution with a relatively high plasticizer concentration either before, or after, but preferably after the transverse stretching process. In this case, treatment with the first dilute plasticizer solution may be omitted, if desired. The membranes produced in this manner are particularly suitable for ultra-diffusion, i.e., a special type of hemodialysis by which toxic metabolites and water can be removed from the blood within a particularly short time. If only a dilute plasticizer solution is applied, either before or after transverse stretching, diffusive permeability and ultrafiltration can be adjusted by transverse stretching alone in a manner which is suitable for hemodialysis. The plasticizer solution with the higher plasticizer concentration advantageously is an aqueous glycerol solution, preferably one with a glycerol content between about 20 and 70 percent by weight. This high plasticizer concentration distinctly exceeds the concentrations normally present in plasticizer baths. The treatment with a plasticizer solution of high concentration, which takes place either before or after the transverse stretching of the cellulose hydrate gel, prevents a reduction of the permeability during the following drying of the cellulose hydrate gel and, surprisingly, causes a rise of the molecular weight exclusion limit, also expressed as the rejection capacity, e.g., for Dextran 10,000. After drying, the membrane contains from about 30 to 60 percent by weight of plasticizer.

The viscose membrane produced by the process according to the invention has a thickness of from about 20 to 60 micron in the wet state. Its permeability for urea is from about $5.5 \times 10^{-4}$ to $15 \times 10^{-4}$ (cm/s), its permeability for vitamin $B_{12}$ ranges from about $0.5 \times 10^{-4}$ to $2 \times 10^{-4}$ (cm/s), and its rejection capacity for Dextran 10,000 is between about 40 and 60 percent. It has an ultrafiltration capacity in the range from about $3 \times 10^{-5}$ to $15 \times 10^{-5}$ (cm/s $\times$ bar), and its bursting pressure (wet) is at about 0.3 to 0.7 bar.

This combination of good qualities, but in particular the possibility to adjust a suitable relation between ultrafiltration and diffusive permeability despite a high wet strength, and the possibility to achieve a very low blood filling volume, render the membrane according to the invention highly suitable for use in hemodialysis. Furthermore, owing to these good properties, the membrane according to the invention may be used with particular advantage for all technical dialysis purposes, for example for cleaning solutions containing high molecular weight components.

The invention will be explained in greater detail by reference to the following illustrative examples and to the drawings which are attached.

FIG. 1 illustrates schematically the apparatus for carrying out the method according to the invention. The treatment to which the cellulose hydrate gel sheet is subjected is described in detail in Example 1.

Figure 2:
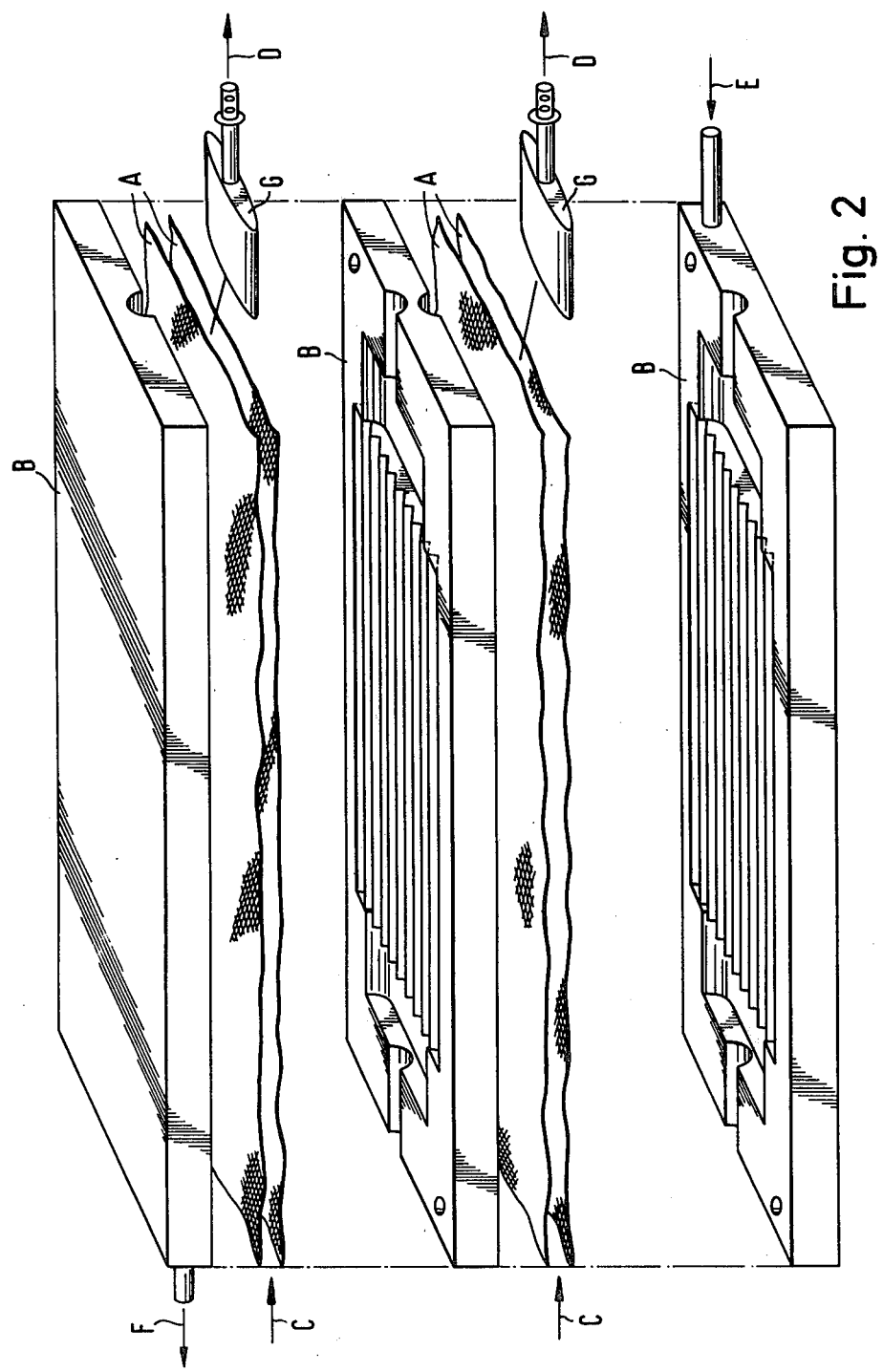
FIG. 2 is a diagrammatic representation showing an exploded view, in perspective, of a plate-type dialyzer.

FIG. 2 is a diagrammatic representation showing an exploded perspective view of a plate-type dialyzer corresponding to a standard-type artificial kidney according to Kiil, in which a viscose membrane according to the invention is used.

In the figure, A is the viscose membrane, B designates rigid plates made, e.g., of plastic material at least one surface of which is provided with a longitudinally grooved effective area in which the membrane adjoins the plate; at C, blood is fed into the space between two neighboring parallel membrane layers of the plate-type dialyzer; at D, the blood leaves the space between the two adjacent membrane layers of the plate-type dialyzer; E is the inlet and F the outlet for the dialyzate; and G is an attachment for other components of the artificial kidney. In the interest of simplicity, the mechanical means used for pressing the plates upon each other were omitted.

The cellulose hydrate gel tube used is produced in each case by a process corresponding to the present state of the art.

EXAMPLE 1

A non-reinforced tube of cellulose hydrate gel (flat width 109 mm) is produced in known manner by the viscose process. The tube is treated with an 11 percent by weight aqueous glycerol solution and is then subjected to the after-treatment illustrated by FIG. 1 of the drawings.

The tube 1 is passed at a speed of 4 m/min. from a container 10 over rollers 2 between two adjustable pairs of squeeze rollers (3 and 4) arranged at a distance of about 4 m from each other and is inflated in the space between the two pairs of rollers by means of compressed air (0.08 bar). A transverse stretching rate of 80 percent is adjusted, and the resulting tube has a diameter of 125 mm. A known device 5 is used for keeping the diameter constant. The pair of squeeze rollers 4 is preceded by feed rollers 11. The thus radially stretched gel tube 1 is collapsed and continuously passed, for a distance of 35 m, over rollers 12 through a plasticizer bath (glycerol content: 64 percent by weight) heated to a temperature of 50° C. After passing through the squeeze rollers 7, the tube 1 is inflated again and is then conducted through a 4 m long tubular hot air drier 9 at a temperature of 95° C., between the squeeze rollers 8, and over the roller 13, and is then wound up on winding roller 14. The cellulose regenerate tube produced from viscose according to the invention is compared with tubes of cellulose regenerate produced by the viscose process and by the cuprammonium process, which hitherto have been used for dialysis purposes, viz. a tube of type "Visking" (trademark of UCC) and a tube of type "Cuprophan" (trademark of ENKA GLANZSTOFF AG). In addition thereto, a dialysis tube of type "Nalo" (trademark of Hoechst AG) is used for comparison. This tube is prepared analogously to Example 1, except that it is not stretched in the transverse direction and is not subjected to an additional plasticizer treatment.

TABLE 1

| Parameters | Cellulose regenerate of the Prior Art | | | Cellulose regenerate of Example 1 |
|---|---|---|---|---|
| | Type NALO® | Type VISKING® | Type CUPROPHAN® | |
| Diameter (mm) | 70 | 100 | 100 | 100 |
| Flat Width (mm) | 109 | 150 | 150 | 150 |
| Area Weight (g/m$^2$) | 52 | 155 | 32 | 61 |
| Dry Thickness (micron) | 38 | 100 | 22 | 43 |
| Wet Thickness (micron) | 79 | 188 | 44 | 55 |
| Glycerol Content (percent by weight) | 19 | 18 | 26 | 56 |
| Bursting Pressure (bar) | 0.61 | 1.91 | 0.38 | 0.52 |
| Ultrafiltration (cm/s × bar) | $4.8 \times 10^{-5}$ | $0.8 \times 10^{-5}$ | $4.4 \times 10^{-5}$ | $8.3 \times 10^{-5}$ |
| Permeability (cm/s) | | | | |
| Urea | $3.9 \times 10^{-4}$ | $1.4 \times 10^{-4}$ | $7.1 \times 10^{-4}$ | $7.2 \times 10^{-4}$ |
| Vitamin B$_{12}$ | $3.0 \times 10^{-5}$ | $0.7 \times 10^{-5}$ | $6.0 \times 10^{-5}$ | $9.0 \times 10^{-5}$ |
| Rejection (%) (Dextran 10,000) | 62 | 65 | 71 | 52 |
| Birefringence | $6.8 \times 10^{-3}$ | $2.0 \times 10^{-3}$ | $13.0 \times 10^{-3}$ | $2.6 \times 10^{-3}$ |
| Phase Difference (nm) | 258 | 200 | 286 | 112 |
| Shrinkage dry/wet (%) | | | | |
| transversely | +1.3 | +1.6 | ~0 | +8.0 |
| longitudinally | +1.9 | −0.5 | +3.3 | +3.0 |

TABLE 2

| Parameters | Cellulose regenerate of the Prior Art (subsequently transversely stretched) Type VISKING® | Cellulose regenerate of Example 2 |
|---|---|---|
| Diameter (mm) | 101 | 100 |
| Flat Width (mm) | 152 | 150 |
| Area Weight (g/m$^2$) | 154 | 45 |
| Dry Thickness (micron) | 98 | 25 |
| Wet Thickness (micron) | 184 | 51 |
| Glycerol Content (percent by weight) | 18 | 21 |
| Bursting Pressure (bar) | 1.91 | 0.54 |
| Ultrafiltration (cm/s × bar) | $0.8 \times 10^{-5}$ | $5.3 \times 10^{-5}$ |
| Permeability (cm/s) | | |
| Urea | $1.5 \times 10^{-4}$ | $6.9 \times 10^{-4}$ |
| Vitamin B$_{12}$ | $0.7 \times 10^{-5}$ | $6.0 \times 10^{-5}$ |
| Rejection (%) (Dextran 10,000) | 65 | 59 |
| Birefringence | $2.0 \times 10^{-3}$ | $2.1 \times 10^{-3}$ |
| Phase Difference (nm) | 196 | 53 |
| Shrinkage dry/wet (%) | | |
| transversely | +1.7 | +1.0 |
| longitudinally | −0.5 | +1.8 |

EXAMPLE 2

A non-reinforced tube is prepared in the conventional manner from cellulose hydrate gel by the viscose process (flat width: 109 mm). After treatment with an aqueous solution containing 11 percent by weight of glycerol, the tube is subjected to the after-treatment illustrated by the drawing, but without the additional plasticizer treatment mentioned in Example 1. The cellulose hydrate gel tube 1 is withdrawn from a roller at a speed of 4 m per minute and is passed between two adjustable pairs of squeeze rollers 3 and 4 where it is inflated (0.08 bar). In this manner, an 80 percent transverse stretching is achieved, the diameter of the resulting tube is 125 mm. The thus radially stretched gel tube is then collapsed, filled again with air to support it, and is then continuously passed through a tubular hot air drier 9 of 4 m length at a temperature of 95° C. Finally, the dry tube is wound up. The cellulose regenerate tube according to the invention is compared with a tube consisting of a cellulose regenerate of type "Visking" (UCC trade mark) which has been subjected to a subsequent transverse stretching process.

EXAMPLE 3

A non-reinforced tube of cellulose hydrate gel (flat width 28 mm) is prepared by the viscose process and subjected to the after-treatment shown in the figure. It is withdrawn from a roller at a speed of 7 m per minute and passed between two adjustable pairs of squeeze rollers 3 and 4 (distance between the pairs about 4.5 m) and inflated with compressed air (0.12 bar). In this manner, a transverse stretching rate of 113 percent is achieved and the resulting tube has a diameter of 38 mm. The thus radially stretched gel tube is collapsed and continually passed, over a distance of 35 m, through a plasticizer bath 6 (55 percent by weight of glycerol) at a temperature of 50° C. The tube is re-inflated, passed over wipers and squeeze rollers, and is then conducted through a 4 m long tubular hot air drier 9 at a temperature of 85° C., and is finally wound up.

The cellulose regenerate tube thus prepared is compared with a comparable tube of small diameter made of cellulose regenerate of type "Visking" (trade mark of UCC).

TABLE 3

| Parameters | Cellulose regenerate of the Prior Art Type "VISKING" ® | Cellulose regenerate of Example 3 |
|---|---|---|
| Diameter (MM) | 30 | 31 |
| Flat Width (MM) | 44 | 48 |
| Area Weight (g/m$^2$) | 31 | 30 |
| Dry Thickness (micron) | 25 | 20 |
| Wet Thickness (micron) | 45 | 31 |
| Glycerol Content (percent by weight) | 15 | 56 |
| Bursting Pressure (bar) | 0.46 | 0.39 |
| Ultrafiltration (cm/s × bar) | 2.5 × 10$^{-5}$ | 11 × 10$^{-5}$ |
| Permeability (cm/s) | | |
| Urea | 4.6 × 10$^{-4}$ | 9.3 × 10$^{-4}$ |
| Vitamin B$_{12}$ | 3.2 × 10$^{-5}$ | 12 × 10$^{-5}$ |
| Rejection (%) (Dextran 10,000) | 65 | 47 |
| Birefringence | 8.7 × 10$^{-3}$ | 3.8 × 10$^{-3}$ |
| Phase Difference (nm) | 218 | 76 |
| Shrinkage dry/wet (%) | | |
| transversely | +1.5 | +5.5 |
| longitudinally | −0.5 | +6.5 |

EXAMPLE 4

A non-reinforced tube of cellulose hydrate gel (flat width 29 mm) is produced by the viscose process. After treatment with an aqueous solution containing 12 percent by weight of glycerol, the tube is subjected to the after-treatment illustrated by the drawing. It is unwound from a roller at a speed of 7 m per minute and passed between two pairs of adjustable squeeze rollers (3 and 4) arranged at a distance from each other of about 4.5 m and is inflated with the aid of compressed air (0.07 bar). In this manner, a transverse stretching rate of 90 percent is achieved and the resulting diameter of the tube is 35 mm. The thus radially stretched gel tube is collapsed, filled with supporting air, and the thus inflated tube is then continuously passed through a 4 m long tubular hot air drier 9 at 85° C. Finally, the tube is wound up. The cellulose regenerate tube according to the invention is compared with a comparable tube of small diameter made of a cellulose regenerate of type "Cuprophan" (a trade mark of ENKA GLANZSTOFF).

TABLE 4

| Parameters | Cellulose Regenerate of the Prior Art Type "Cuprophan" ® | Cellulose Regenerate of Example 4 |
|---|---|---|
| Diameter (mm) | 30 | 30 |
| Flat Width (mm) | 46 | 46 |
| Area Weight (g/m$^2$) | 31 | 17 |
| Dry Thickness (micron) | 25 | 13 |
| Wet Thickness (micron) | 44 | 26 |
| Glycerol Content (percent by weight) | 24 | 27 |
| Bursting Pressure (bar) | 0.29 | 0.35 |
| Ultrafiltration (cm/s × bar) | 5.5 × 10$^{-5}$ | 7.1 × 10$^{-5}$ |
| Permeability (cm/s) | | |
| Urea | 7.6 × 10$^{-4}$ | 8.6 × 10$^{-4}$ |
| Vitamin B$_{12}$ | 6.6 × 10$^{-5}$ | 8.0 × 10$^{-5}$ |
| Rejection (%) (Dextran 10,000) | 69 | 58 |
| Birefringence | 18.1 × 10$^{-3}$ | 3.6 × 10$^{-3}$ |
| Phase Difference (nm) | 450 | 47 |
| Shrinkage dry/wet (%) | | |
| transversely | −21.7 | +7.5 |
| longitudinally | +9.6 | +5.1 |

What is claimed is:

1. In a method for performing hemodialysis, including the step of contacting blood with one side of a regenerated cellulose membrane and a rinsing fluid on the other side of said membrane, wherein the improvement comprises said membrane comprising the viscose membrane produced by a process consisting essentially of the steps of:
   providing a viscose solution by xanthogenation;
   spinning the viscose solution by extrusion through a slot die to produce a viscose membrane;
   regenerating the extruded viscose membrane to produce a membrane of cellulose hydrate gel;
   freeing the membrane of cellulose hydrate gel through a bath containing a plasticizer for the cellulose hydrate to plasticize the membrane;
   subsequent to said regeneration step and prior to the hereinafter recited drying step, transversely stretching the cellulose hydrate gel membrane by an amount between about 40 and 120 percent sufficient to compensate for any longitudinal stretching which occurs inherently in the foregoing steps and to produce, upon drying, a cellulose hydrate membrane substantially equally oriented in the longitudinal and in the transverse directions; and
   thereafter drying the transversely stretched membrane, to produce a viscose membrane substantially equally oriented in the longitudinal and in the transverse directions and having in the dry state a birefringence of not more than about 6×10$^{-3}$ and a phase difference of not more than about 150 nm.

2. A method for performing hemodialysis as defined in claim 1, further comprising the step of applying a pressure gradient across said membrane sufficient to separate water from the blood.

3. A method according to claim 1, wherein said viscose membrane undergoes during transition from the dry state to the wet state a shrinkage of between about 0.5 to 10 percent in both the longitudinal and transverse direction.

4. A method according to claim 1, wherein said amount of transverse stretching comprises from about 60 to 100 percent.

5. A method according to claim 1, wherein said membrane comprises after drying from about 30 to 60 percent by weight of a plasticizer for the viscose.

6. In an apparatus for performing hemodialysis including a hemodialysis membrane, means for transporting blood into contact with a first side of said membrane and means for withdrawing metabolites from a second side of said membrane in a rinsing fluid, wherein the improvement comprises said dialysis membrane comprising the viscose membrane produced by a process consisting essentially of the steps of:
   providing a viscose solution by xanthogenation;
   spinning the viscose solution by extrusion through a slot die to produce a viscose membrane;
   regenerating the extruded viscose membrane to produce a membrane of cellulose hydrate gel;

freeing the membrane of cellulose hydrate gel from acids, salts and sulfur-containing products;

passing the membrane of cellulose hydrate gel through a bath containing a plasticizer for the cellulose hydrate to plasticize the membrane;

subsequent to said regeneration step and prior to the hereinafter recited drying step, transversely stretching the cellulose hydrate gel membrane by an amount between about 40 and 120 percent sufficient to compensate for any longitudinal stretching which occurs inherently in the foregoing steps and to produce, upon drying, a cellulose hydrate membrane substantially equally oriented in the longitudinal and in the transverse directions; and thereafter drying the transversely stretched membrane, to produce a viscose membrane substantially equally oriented in the longitudinal and in the transverse directions and having in the dry state a birefringence of not more than about $6 \times 10^{-3}$ and a phase difference of not more than about 150 nm.

7. An apparatus according to claim 6, wherein said viscose membrane undergoes during transition from the dry state to the wet state a shrinkage of between about 0.5 to 10 percent in both the longitudinal and transverse direction.

8. An apparatus according to claim 6, wherein said amount of transverse stretching comprises from about 60 to 100 percent.

9. An apparatus according to claim 6, wherein said membrane comprises after drying from about 30 to 60 percent by weight of a plasticizer for the viscose.

10. An apparatus according to claim 9, wherein said plasticizer comprises glycerol, sorbitol or glucose.

11. An apparatus according to claim 10, wherein said plasticizer comprises glycerol.

12. An apparatus according to claim 11, wherein said viscose membrane comprises a tube.

* * * * *